United States Patent Office 2,920,966
Patented Jan. 12, 1960

2,920,966

EGG-MILK PRODUCT

Burdet Heinemann, Springfield, Mo., assignor to Producers Creamery Company, Springfield, and Missouri Farmers Association, Inc., Columbia, Mo., both corporations of Missouri No Drawing. Application August 12, 1957
Serial No. 677,799

9 Claims. (Cl. 99—113)

This invention relates to improvements in egg products and, more particularly, to improvements in egg products of the type consisting of a preparation of eggs mixed with milk solids and sugars wherein the preparation is characterized by its good preservative features.

More specifically, this invention relates to the simultaneous use of eggs, milk solids and sugars selected from the group of monosaccharides and disaccharides, with the mixture being controlled as to total solids content thereof such as to maintain the moisture content of the mixture below 35% by weight and wherein the percentage by weight of sugar is maintained between about 50% to 62%.

It is well recognized that egg products in their natural or even dried state tend to spoil or decay rather rapidly and it is also well recognized and has, in fact, been in practical usage in the art for some time to admix sugar and egg products either in the liquid or dried form, the sugar serving as a preservative for the egg product, the effectiveness of which is primarily due to the particular amount of sugar used and the presence or absence of other well known and long recognized preservative materials. Among other things, the prior art teaches the use of egg and sugar mixtures either in liquid or dried form and with various relationships as to percentage of content existing between these two ingredients. The prior art recognizes that a dried product obviates some of the problems inherent in the liquid form, notably the tendency toward gelatinization and it is common to practice variations in the basic process such as the additional step of heating the mixture and adding stabilizing agents thereto. Other variations embody the use of milk and eggs in liquid and dried form.

In contrast to this, it is a primary object of this invention to provide an egg product having extremely good preservative characteristics and properties wherein such properties are achieved by the addition of both milk solids and sugar thereto wherein the additions are made in controlled amounts and wherein this relationship is taken in conjunction with a controlled moisture content of the resultant mixture.

It is a further object of this invention to provide a new and novel egg product characterized by the presence of eggs, milk solids and sugar in such proportions and in conjunction with a controlled moisture content of the mixture so as to impart thereto the properties of being free from any tendency to gelatinize or stratify and being able to be stored without spoilage for a great period of time.

It is another object of this invention to provide a mixture of the character described wherein the moisture content is maintained below about 35% by weight of the mixture and wherein the percentage by weight of sugar is maintained between about 50% to 62%, the mixture being characterized by its highly desirable preservative characteristics and freedom from gelation or stratification.

In accordance with this invention, it is proposed to produce a preparation of liquid egg mixed with sugar carbohydrates and milk solids, with the resultant product being characterized by having good preservation qualities suitable for industrial or domestic use.

In conjunction with the use of the product, there are many instances in the food industry wherein a preparation of milk, eggs and sugar is required, as, for example, in the preparation of a wide variety of cakes and cookies and in general with relation to baking products and many other food products, such as ice cream which are made with such a basic mixture.

More particularly, the product in accordance with this invention envisages the incorporation of a mixture of the above mentioned three ingredients in liquid form wherein the moisture content of the mixture is maintained within certain limits and wherein the percentage by weight of the sugar carbohydrate is also maintained within a definite range so as to insure an end product which does not gel on storage and which may be kept for great periods of time.

By way of illustration, the following examples are given:

Example I

One product exemplifying this invention was prepared by mixing 27.5% by weight of whole egg with 17.5% of 40% skim condensed milk and 55% sugar. The ingredients were mixed at approximately room temperature, that is to say, at a temperature sufficient to cause complete solution, the milk, as designated, containing 40% total solids. With the mixture as described, the moisture content thereof is approximately 28% and the resultant mixture which was heated to a temperature of about 140° F. for 5 minutes sufficient to destroy all molds and mold spores and was then poured into sterilized containers and sealed. Alternatively, the mixture could be stored in any manner.

Example II

Another product prepared in accordance with this invention consisted of 14% whole egg by weight, 30% by weight of skim condensed milk and 56% sugar. This preparation contained approximately 26% moisture by weight and was prepared in the same manner in which the ingredients were treated in Example I above.

Example III

Another preparation in accordance with this invention consisted of 26.5% whole egg by weight, 16% egg yolk by weight, 4% by weight of 40% skim condensed milk and 52½% sugar. This product was likewise prepared in the same manner as set forth with regard to Example I above. The moisture content of this product was approximately 27%.

Example IV

A further preparation consisted of 30½% of egg yolk by weight, 17½% by weight of 40% skim condensed milk and 52% sugar and this product was also prepared under the conditions set forth in Example I. The moisture content of this product was approximately 26%.

Example V

By way of further example, a satisfactory product was obtained by utilizing a mixture of 20% by weight of 45% skim condensed milk, 30% by weight of egg yolk and 50% by weight of sugar.

Example VI

By way of further example, a satisfactory product was obtained by utilizing a mixture of 30% by weight of egg whites, 10% by weight of nonfat dry milk, and 60% by weight of sugar.

Example VII

By way of further example, a satisfactory product was obtained by utilizing a mixture of from 4 to 10 parts by weight of nonfat dry milk, 50 to 62 parts by weight of sugar and 25 to 35 parts by weight of egg yolk.

Further experimentation has revealed that many combinations of whole egg, egg yolk, condensed milk (whole or skim) and sugar are possible provided that the moisture content of the mixture does not exceed 35% by weight and preferably is maintained at or below 30%. When the product is to be stored only for a relatively short time, the moisture content may be in the upper limits of the specified range, that is, at or near 35%, but for most commercial uses a moisture content of about 28%, or in any case below 30%, is preferred since this assures the best preservative characteristics for the mixture. In addition, it has been found that the sugar content must be maintained between about 50% to 62% by weight.

The particular percentage of sugar used, that is, within the specified range of from about 50% to 62% is dependent, in any particular mixture, upon the percentages of the other products to be used to assure that the resultant mixture is within the specified moisture content range and this, to some extent, also fixes the percentages of milk solids, whole egg and/or egg yolk which are used in the mixture.

For example, the mixture prepared in accordance with Example II was accomplished by simple agitation and the percentage of sugar used, 56% by weight, represents about the maximum percentage which could be used by the simple agitation process with the specified percentages of other ingredients involved and to attain a moisture content within the desired range, in this particular case about 26%. It would be possible, in Example II, to obtain complete solution while using 62% by weight of sugar if the mixture were heated to approximately 140° F., although this, of course, would lower the total moisture content of the mixture.

Of course, the ultimate use of the product is controlling in so far as the particular percentages of the components are concerned, but in practicing the invention, the sugar content and total moisture content must be controlled within the limits set forth above in order to obtain an end product having the desired characteristics.

Aside from this, the amount of milk solids used in the mixture must be within controlled amounts since the amount of milk solids used in the mixture affects the gelation properties of the egg components.

In the specific examples enumerated, the sugar was either cane or beet sugar, although other sugars from the group of monosaccharides or disaccharides may be used to advantage.

The sugar content should range between 50% and 62% by weight of the total mixture and the sugar content should consist of at least three-fourths disaccharide and up to one-fourth mono-saccharide. As concerns the use of condensed milk, practical considerations limit the amount of total solids therein to less than about 45%, it being preferred in most instances that condensed milk containing about 40% solids be used.

At the same time, it will be noted that the total amount of egg, percentagewise, used varies within a range of from about 14% to about 42½%. The lower extremity of the range is exemplified by Example II wherein 14% by weight of whole egg is used and the greatest percentage being set forth in Example III wherein 26½% by weight of whole egg and 16% by weight of egg yolk is used, this total being 42½%. Therefore, the milk solids range between 1.6% and 12% and the egg products range between 14–42.5% and as specified, the sugar ranges between 50% and 62% with the moisture content in all cases being maintained below about 35%.

While in the specific examples enumerated above, in each case the skim condensed milk contained 40% total solids, other solids concentrations may be used, although at the present, as limited by the equipment used in the processing of milk, a maximum total solids of about 45% are all that can be realized. Nonfat dry milk may be satisfactorily used as can be whole milk, whole condensed milk or dry whole milk.

Mixtures such as are above described would, of course, be subject to mold growth if exposed to air during the storage of the product. However, this may be prevented by heating the mixture to temperatures sufficient to destroy all molds and mold spores and then filling sterilized containers under conditions which prevent the access of molds. Alternatively, the product could, of course, be stored in such a manner as to be devoid of air such as, for example, by filling the container with the product so that no air space remains. After the product is heated, it may be placed directly into a container and sealed and then subsequently cooled or it may be cooled first and then packaged. Another way which has been found to be effective in the prevention of mold growth is to incorporate sorbic acid in concentrations of 0.01% to 0.5% and preferably 0.05% during the mixing of the eggs, milk and carbohydrate.

From the above, it will be evident that a novel egg product has been accomplished in which controlled proportions of egg, either whole egg, egg whites, or egg yokes, are mixed with milk and sugar to provide a satisfactory means of preserving the mixture and to retain the same in liquid form with such liquid being of the type which does not gel or stratify on storage. In this connection, although the chemistry involved is not clear, the product as herein disclosed has been found to be able to be held at room temperature for over six months without stratification, gelation or other deleterious effects.

Therefore, a liquid product has been achieved so that a user may easily and conveniently measure and pour the same during the use of the product in conjunction with baked goods and for that matter, any other product which requires milk, sugar and egg mixed.

I claim:

1. An egg-milk product characterized by its ability to be stored for long periods of time without stratification, gelation and spoilage, consisting of a mixture of whole egg, 40% total solids skim condensed milk and sugar, wherein the amount of sugar constitutes 55% by weight of the total mixture, the egg constitutes 27.5% by weight of the total mixture, the condensed milk constitutes 17.5% by weight of the total mixture, and wherein the total moisture content of the mixture is about 28% by weight of the total mixture.

2. An egg-milk product characterized by its ability to be stored for long periods of time without stratification, gelation and spoilage, consisting of a mixture of whole egg, sugar and 40% total solids skim condensed milk, the whole egg constituting 14% by weight of the weight of the total mixture, the condensed milk constituting 30% by weight of the weight of the total mixture, the sugar constitutes 56% by weight of the total mixture, and wherein the moisture content by weight of the total weight of the mixture is about 26%.

3. An egg-milk product characterized by its ability to be stored for long periods of time without stratification, gelation and spoilage, consisting of a mixture of whole egg, egg yoke, sugar and milk, wherein the amount of whole egg constitutes 26.5% by weight of the total mixture, the egg yoke constitutes 16% by weight of the total mixture, the milk constitutes 4% by weight of the total mixture, the sugar constitutes 52.5% by weight of the total mixture, wherein the milk is 40% total solids skim condensed milk, and wherein the moisture content of the mixture is about 27% by weight of the mixture.

4. An egg-milk product characterized by its ability to be stored for long periods of time without stratification, gelation and spoilage, consisting of a mixture of egg yoke, 40% total solids skim condensed milk and sugar, the egg yoke being added in an amount to constitute 30.5% by weight of the total mixture, the milk constitutes 17.5% by weight of the total mixture, the sugar constitutes 52% by weight of the total mixture, and wherein the moisture content of the mixture is about 26% by weight of the mixture.

5. An egg-milk product characterized by its ability to be stored for long periods of time without stratification, gelation and spoilage, consisting of a mixture of egg yoke, 45% total solids skim condensed milk and sugar, the egg yoke being added in an amount to constitute 30% by weight of the total mixture, the milk being added in an amount to constitute 45% by weight of the total mixture, and the sugar being added in an amount to constitute 50% by weight of the total mixture, and wherein the moisture content does not exceed 35% by weight of the mixture.

6. An egg-milk product characterized by its ability to be stored for long periods of time without stratification, gelation or spoilage, consisting of a mixture of eggs, sugar and milk solids, wherein the sugar is in the range of about 50% to about 62% by weight of the total mixture, wherein the milk solids are obtained by the addition of skim condensed milk in the range of about 4% to about 30% by weight of the total mixture, the eggs are within the range of about 14% to about 42½% by weight of the total mixture and wherein the total moisture content of the mixture does not exceed about 35% by weight of the total mixture.

7. An egg-milk product characterized by its ability to be stored for long periods of time without stratification, gelation or spoilage, consisting of a mixture of eggs, sugar and condensed milk, wherein the sugar is a mixture of up to one-fourth monosaccharide and at least three-fourths disaccharide and is within the range of about 50% to about 62% by weight of the total mixture, wherein the total solids in the condensed milk is less than about 45% and the condensed milk is present in the range of about 4% to about 30% by weight of the total mixture, said eggs being present in the range of about 14% and about 42½% by weight of the total mixture, and wherein the total moisture content of the mixture does not exceed 35% by weight of the total mixture.

8. An egg-milk product characterized by its ability to be stored for long periods of time without stratification, gelation or spoilage, consisting of a mixture of eggs, sugar and milk solids, wherein the sugar is in the range of about 50% to about 62% by weight of the total mixture, the milk solids are in the form of non-fat dry milk within the range of about 4% to about 10% by weight of the total mixture, the eggs are within the range of about 25% to about 35% by weight of the total mixture, and wherein the total moisture content of the mixture does not exceed about 35% by weight of the total mixture.

9. The product as defined in claim 8 wherein said sugar is a mixture of up to one-fourth monosaccharide and at least three-fourths disaccharide.

References Cited in the file of this patent

UNITED STATES PATENTS

| 762,277 | Campbell | June 14, 1904 |
| 1,385,246 | Crocker | July 19, 1921 |
| 2,520,954 | North et al. | Sept. 5, 1950 |

FOREIGN PATENTS

| 1,113 of 1902 | Great Britain | Mar. 6, 1902 |